Figure 1:
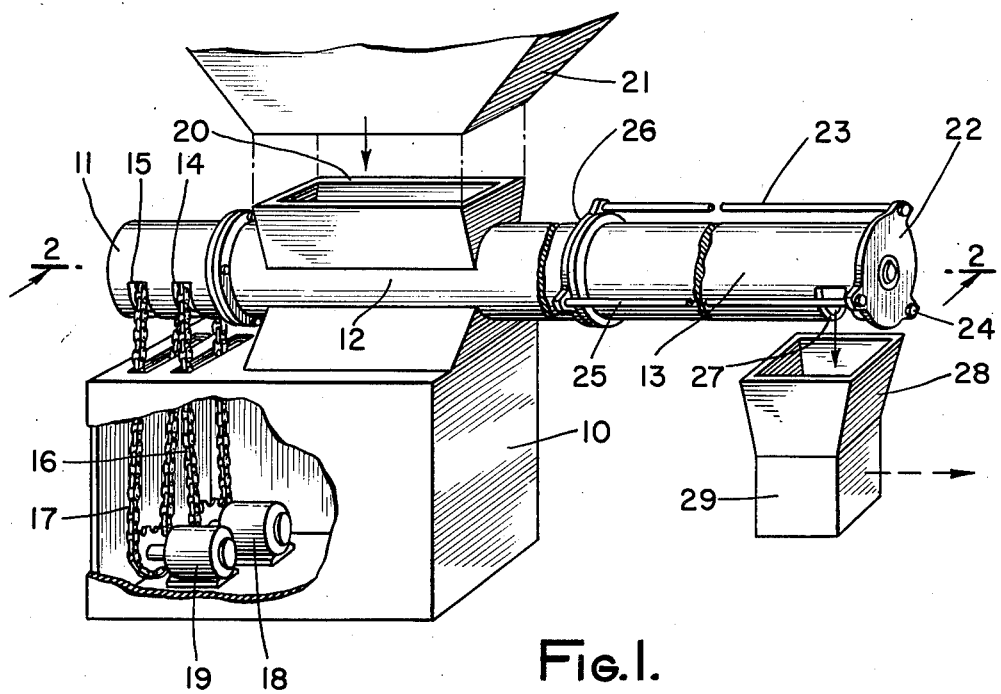

April 24, 1962

R. J. FREED 3,030,898

DOUGH TREATING MACHINE

Filed April 30, 1959

2 Sheets-Sheet 1

INVENTOR.
RUDOLPH J. FREED
BY
Elliott & Pastoriza
ATTORNEYS

April 24, 1962 R. J. FREED 3,030,898
DOUGH TREATING MACHINE
Filed April 30, 1959 2 Sheets-Sheet 2

INVENTOR.
RUDOLPH J. FREED
BY
Elliott & Pastoriza
ATTORNEYS

United States Patent Office 3,030,898
Patented Apr. 24, 1962

3,030,898
DOUGH TREATING MACHINE
Rudolph J. Freed, Los Angeles, Calif., assignor to Bak-Kraft Corporation, Ltd., Los Angeles, Calif., a corporation of California
Filed Apr. 30, 1959, Ser. No. 810,140
2 Claims. (Cl. 107—40)

This invention relates generally to the baking art and more particularly to a dough treating machine for improving the texture of dough prior to feeding it into a conventional divider or any scaling device. This application is a continuation-in-part of my now abandoned, co-pending application, Serial Number 736,783, filed May 21, 1958, and entitled, "Dough Treating Machine."

In commercial bakeries, dough for making bread, rolls, buns and the like is initially made up by mixing the various ingredients such as flour, water, milk, sugar, yeast and the like in a mixing machine. After mixing for a given period of time in the case of straight dough, it is removed and allowed to stand in troughs for anywhere from one to three hours. In sponge dough, only a certain amount of the flour is initially placed in the mixer, and after the sponge dough has been in the troughs to ferment for a given period of time, it is replaced in the mixer and the remaining flour and other ingredients are added and mixed in.

From the mixer or troughs, depending upon whether the dough is straight or sponge, it is fed into a divider. The divider is essentially a scaling machine which will separate and group the dough into given sizes depending, for example, upon the size of the individual baking pans used in baking the dough.

During the period in which the dough is in the troughs, some fermentation takes place and small air pockets or bubbles will form in the dough. This trapped gas changes the texture of the dough and can result in non-uniform products after scaling and baking. For example, in conventional bread loaves, the texture of the bread itself is seldom uniform and in some instances relatively large gaps or air pockets are evident.

Bearing the above in mind, it is a primary object of the present invention to provide a dough treating machine for improving the texture of dough prior to feeding into the divider to the end that more uniform and improved quality bread, rolls, buns and the like are provided.

More particularly, it is an object to provide a dough treating machine for minimizing air pockets and trapped gases in dough resulting from various causes, such as fermentation, to render the texture of the dough more uniform.

Another important object is to provide a dough treating machine capable of receiving dough directly from a mixer and retaining the dough for a period of time sufficient to effect the desired fermentation, whereby a continuous bread making process is possible and troughs and the like heretofore provided for fermentation purposes can be eliminated.

Still another important object is to provide a dough treating machine which can be readily disassembled for easy cleaning.

Another object is to provide a dough treating machine designed to operate with conventional type hoppers so that no modification of existing equipment is necessary.

Briefly, these and many other objects and advantages of this invention are attained by providing a dough treating machine arranged to receive dough from the mixer and feed the dough into the divider. The machine itself includes a rectangular inlet opening dimensioned to receive standard hoppers presently in use. This opening communicates with an elongated housing having a cylindrical interior. Within the housing there is provided a driving impeller and a paddle member in axial alignment. The impeller and paddle member are driven at different rotational rates by a compound shaft structure. The housing and compound shaft structure include novel features for enabling easy disassembly to facilitate cleaning. The cylindrical interior of the housing surrounding the paddle members includes elongated cutting blades directed radially inwardly. The arrangement is such that dough from the mixer fed into the hopper and housing is forced by the impeller screw into the paddle member. This impeller driving force in addition to the action of the cutting blades and the centrifugal force created by rotation of the paddle member compresses the dough and thoroughly beats and cuts the dough under a considerable pressure which builds up within the housing. Any trapped air bubbles or other gases are released during this process and the treated dough may then be passed from an outlet in the housing directly into the divider. The treating process is continuous in operation and essentially serves to change the texture of the dough from the mixer prior to being fed to the divider.

By increasing the physical length of the housing and properly adjusting its dimensions and individual rates of rotation of the impeller and paddle member, the length of time the dough is retained within the machine can be made sufficient to permit fermentation to take place and thus render possible an overall continuous bread making process.

Figure 2:
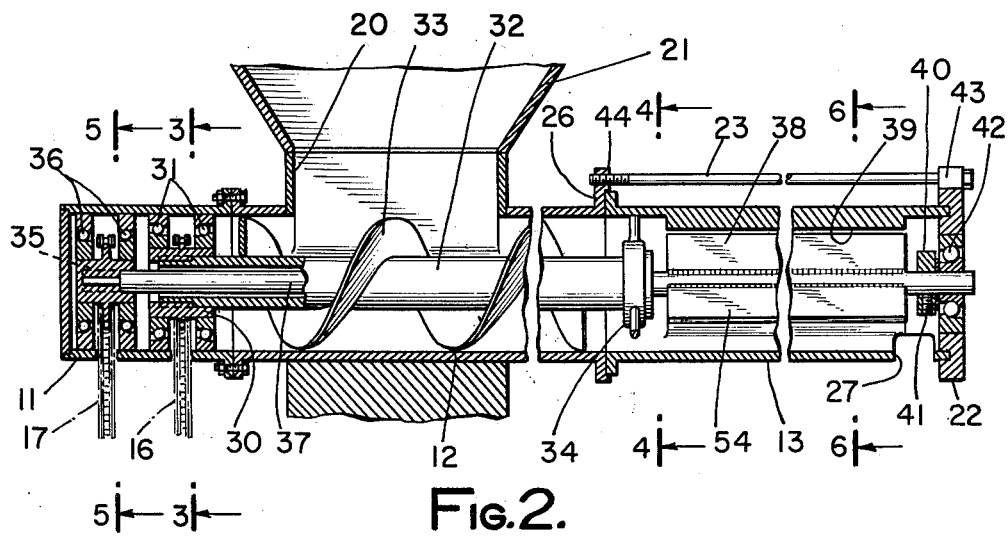

A better understanding of the invention will be had by referring to a preferred embodiment thereof as illustrated in the accompanying drawings, in which:

FIGURE 1 is a schematic perspective view partly cut away, illustrating the dough treating machine in position to receive dough from a conventional hopper and feed the dough to a divider;

FIGURE 2 is a partial cross sectional view of the dough treating machine taken in the direction of the arrows 2—2 of FIGURE 1; and, FIGURES 3, 4, 5, and 6 are cross sectional views of the machine taken in the direction of the arrows 3—3, 4—4, 5—5, and 6—6, respectively of FIGURE 2.

Referring to FIGURE 1, there is shown a supporting enclosure 10 mounting an elongated housing made up of first, second, and third cylindrical sections 11, 12, and 13, respectively. As shown, the cylindrical section 11 includes first and second circumferential slots 14 and 15 receiving flexible driving members in the form of chains 16 and 17 in turn driven by individual motors 18 and 19 within the enclosure 10.

The center section 12 includes an upper rectangular opening 20 of given standard dimensions for receiving a conventional hopper 21. The hopper 21 is illustrated in exploded view above the opening 20 in FIGURE 1. When the device is assembled for operation, the hopper 21 mates with the rectangular opening 20 as shown in FIGURE 2.

The far end of the third section 13 includes an end cap 22 having peripheral ears through which tie rods 23, 24, and 25 pass. As shown, these tie rods extend parallel to the axis of and exterior to the third section to connect to an end flange 26 on the second section 12. The arrangement is such that removal of the tie rods 23, 24, and 25 will enable separation of the third section 13 from the second section 12.

On the lower portion of the third section adjacent the end cap, there is provided an outlet opening 27. This opening is normally positioned above a hopper 28 feeding into a conventional divider 29 as indicated schematically by the blocks. Thus, dough from a mixer is initially received within the hopper 21 and fed through the inlet opening 20 of the elongated housing. Within the housing, the dough is treated in a manner to alter its texture prior to feeding into the hopper 28 of the divider 29.

In FIGURE 1, "break" lines are illustrated cutting across the second section 12 and third section 13 to indicate that these sections may be considerably longer than illustrated.

Referring to the first section 11 as shown in FIGURE 2, it will be noted that the driving chain 16 connects to a splined socket pulley body 30 rotatably mounted to the inner cylindrical wall of the section 11 as by bearings 31. The body 30 is arranged to receive a splined end of an outer hollow shaft 32 provided with an helical impeller blade or screw 33. The other end of the outer shaft 32 is supported within a first end bearing 34 secured adjacent the connecting point of the second section 12 and third section 13. By this arrangement, the drive chain 16 will rotate the splined socket pulley body 30 and through the spline connection with the splined end of the outer shaft 32, rotate this outer shaft.

Similarly, the driving chain 17 connects to a second splined socket pulley body 35 co-axially aligned with the body 30 within the rearmost portion of the first section 11. The body 35 is also rotatably mounted to the inside cylindrical wall of the section 11 as by bearings 36 and is arranged to receive the splined end of an inner shaft 37. As shown, the inner shaft 37 is longer than the outer shaft 32 and thus protrudes from each end. The far protruding end of the inner shaft 37 extends throughout the majority of the length of the third section 13 and includes radially extending paddle elements such as indicated at 38. These paddle elements terminate short of the inner cylindrical wall of the third section 13. This wall surface, in turn, includes a plurality of radially inwardly projecting longitudinal blades such as indicated at 39.

The far end of the inner shaft 37 includes a collar 40 secured to the shaft by a set screw 41 to provide a thrust bearing co-operating with roller bearings 42 in the end cap 22. By this arrangement, it will be evident that the inner shaft 37 is rotatably supported independently of the outer shaft 32 and by driving the drive chains 16 and 17 at different speeds, the impeller blade 33 and paddle elements 38 may be caused to rotate at different speeds.

One manner of securing the tie bars such as the tie bar 23 is illustrated in FIGURE 2. As shown, the ear 43 on the peripheral edge of the end cap 22 includes a straight through bore and the tie bar 23 itself is in the form of a bolt having its end threaded within the flange 26 as at 44. Thus, in disassembling the device, the tie bar 23 need only be unthreaded from the flange 26 and the entire third section 13 together with the end cap and bearings 42 may be removed.

A better understanding of the compound shaft structure and other components described will be had by now referring to the various cross sectional views shown in FIGURES 3, 4, 5, and 6.

Figure 3:
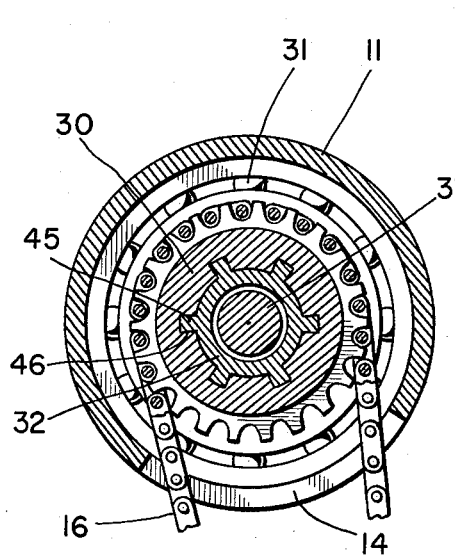

Referring first to FIGURE 3, there is shown the first splined socket pulley body 30 and the hollow splined end of the shaft 32. As shown, this splined end includes radially extending lands 45 receivable in corresponding grooves 46 in the socket of the body 30. It will be evident, accordingly, that the splined body is locked to the shaft with respect to relative rotation between the body and shaft and yet the shaft may move longitudinally with respect to the body; that is, out of the plane of the paper as illustrated in FIGURE 3.

Figure 4:
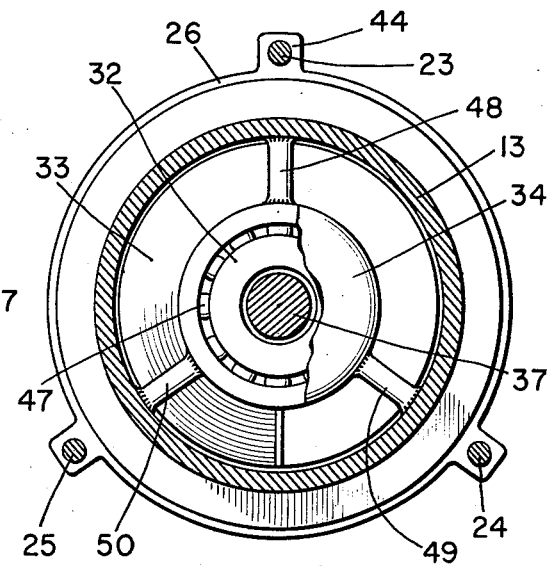

FIGURE 4 shows the first end bearing support for the far end of the outer shaft 32 of FIGURE 2 wherein roller bearings 47 are shown in the broken away portion. A spider structure comprising spokes 48, 49, and 50 serves to support the bearing in a central position. This end bearing also acts as a thrust bearing for the shaft 32 as indicated by the end portion thereof not broken away in FIGURE 4. By employing only three spokes as shown, there is still provided a relatively large passage area for dough to pass from the second section 12 to the third section 13.

Figure 5:
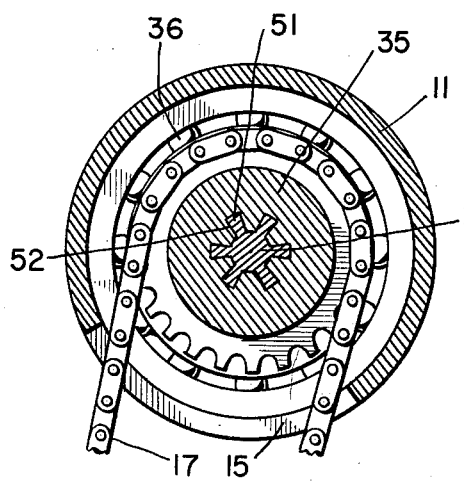

Referring now to FIGURE 5, there is a cross sectional view similar to FIGURE 3 illustrating the second splined socket pulley body 35. As shown, the splined end of the inner shaft 37 includes radially projecting lands 51 receivable within longitudinal grooves 52 on the inside socket portion of the body 35. As in the case of FIGURE 3, by the foregoing arrangement, the body is locked to the shaft with respect to relative rotation whereas the shaft is free to move longitudinally with respect to the body.

Figure 6:
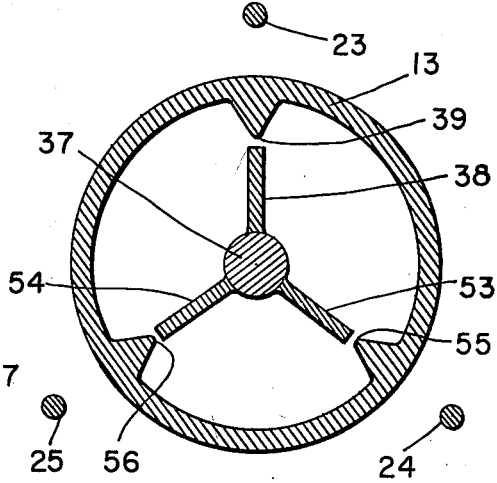

FIGURE 6 illustrates more clearly the paddle elements such as the element 38 and as shown there are provided three such elements, the other two being circumferentially spaced 120° from the paddle 38 as indicated at 53 and 54. Similarly, there are provided two additional elongated blades corresponding to the blade 39 and disposed circumferentially 120° therefrom as indicated at 55 and 56. The radially inwardmost edge of the blades terminate short of the radially outwardmost points of the paddles so that there is a slight clearance as indicated.

In operation, dough from the mixer is received within the hopper 21 and fed through the rectangular opening 20 illustrated in FIGURES 1 and 2. The motors 18 and 19 are preferably driven at different speeds to rotate the compound shaft structure comprising the outer shaft 32 and inner shaft 37 at different speeds. The speed of the outer shaft 32 is determined in accordance with the desired rate of movement of the dough through the machine and is generally considerably slower than the speed of the inner shaft 37 which serves to rotate the paddle members. Dough will be engaged by the impeller blade 33 and moved from the opening 20 through the second housing 12 to the right as viewed in FIGURE 2. Since the outlet opening 27 in the third section 13 is smaller than the inlet opening, the dough will be compressed by the impeller screw within the second and third sections and in its movement into the third section, the elongated blades such as 39 will slice long longitudinal cuts therein. This action co-operates with the rapidly rotating paddle elements 38 to thoroughly break-up, beat, and knead the dough to the end that trapped gases and the like can readily escape from the dough to eventually leak out the outlet opening 27. The beating and kneading action of the rapidly rotating paddle serves to change the texture of the dough and result in a finer more uniform texture of dough expelled from the outlet opening 27.

By increasing the internal dimensions of the various cylindrical sections 12 and 13 and also making them of a considerable length, the duration of time that the dough is retained within the housing can be made equal to the required fermentation time of the dough so that fermentation can take place while the dough is traveling through the housing. This fermentation time may, for example, be of the order of thirty to forty-five minutes. It will also be evident that the rate of rotation of the impeller outer shaft 32 can be changed to vary the rate of speed that the dough travels through the housing, this also affecting the duration of time the dough is retained within the housing. By properly adjusting all of these parameters, it is possible to effect fermentation of the dough as well as the desired treating thereof to alter its texture thereby enabling a continuous bread making process to be achieved.

As briefly described heretofore and as is evident from FIGURE 2, by making the elongated housing in the form of three cylindrical sections fastened together, the entire structure may be readily cleaned by simply disconnecting the various fastening means and removing the cylindrical sections. For example, after the section 13 has been removed by unthreading the tie rods 23, the inner shaft 37 may be withdrawn longitudinally with respect to the splined socket of the body 35. Thus, the paddle element and shaft structure can be thoroughly cleaned.

Similarly, when the third section 13 has been removed, the outer shaft 32 may be withdrawn from its splined socket body 30, the first end bearing 34 being removed from the end of the outer shaft 32 with the section 13.

It will also be evident that the first section 11 may be disconnected from the second section 12 after the outer and inner shafts have been removed to permit servicing of the splined socket pulley bodies if any is necessary.

Because the inlet opening 20 is of standard given rectangular dimensions corresponding to the outlet dimension of standard hoppers employed in the industry, many different types of hoppers may be readily connected to the structure thereby eliminating the expense and further bulk of a special hopper for the machine.

While only a preferred embodiment of the invention has been described and illustrated, it will be understood that various modifications can be made that fall within the scope and spirit of the invention. The dough treating machine is, therefore, not to be though of as limited to the particular example set forth for illustrative purposes.

What is claimed is:

1. A dough treating machine for receiving and treating dough from a mixer and feeding it to a divider, comprising, in combination: an elongated housing made up of first, second, and third cylindrical sections; fastening means securing said sections together in co-axial alignment, said second section having a rectangular inlet opening of given dimensions on its upper side for connection to a hopper to receive dough from said mixer, and said third section having an outlet opening on its lower side adjacent its far end to pass said dough to said divider; a compound shaft structure comprising a hollow outer shaft and a longer inner co-axial shaft protruding from each end of said outer shaft, said shafts having splined ends; a first splined socket pulley body rotatably mounted within said first section for receiving the splined end of said outer shaft; a second splined socket pulley body rotatably mounted within said first section in axial alignment with said first body for receiving the protruding splined end of said inner shaft; a first end bearing within said housing adjacent the connection point of said second and third sections rotatably supporting the other end of said outer shaft; a second end bearing secured to the end of said third section; for rotatably supporting the other protruding end of said inner shaft, said outer shaft including an impeller screw and said other protruding end of said inner shaft including radially extending paddle elements, said first section having first and second circumferential slots in radial alignment with said first and second pulley bodies; and first and second drive means exterior of said housing and including flexible driving members passing through said slots to said pulley bodies respectively for rotating said pulley bodies at individual speeds, whereby dough received in said inlet opening is moved from said second section towards said third section by said impeller screw and thoroughly kneaded by said paddle elements prior to passing out said outlet opening to said divider, and whereby said fastening means may be disconnected to enable removal of said third section and subsequent withdrawal of said outer and inner shafts from said first and second splined socket pulley bodies for cleaning.

2. The subject matter of claim 1, in which the inside cylindrical wall of said housing includes radially inwardly directed cutting blades running longitudinally and co-extensively with said paddle element.

References Cited in the file of this patent

UNITED STATES PATENTS

| | | |
|---|---|---|
| 863,713 | Guss | Aug. 20, 1907 |
| 1,831,779 | MacDonald | Nov. 10, 1931 |
| 2,524,999 | Schulerud | Oct. 10, 1950 |
| 2,868,143 | Strahmann | Jan. 13, 1959 |

FOREIGN PATENTS

| | | |
|---|---|---|
| 568,094 | Great Britain | Mar. 19, 1945 |
| 735,184 | Great Britain | Aug. 17, 1955 |
| 1,073,936 | France | Mar. 31, 1954 |